US011511993B2

(12) United States Patent
Takikawa et al.

(10) Patent No.: US 11,511,993 B2
(45) Date of Patent: Nov. 29, 2022

(54) METHOD FOR PRODUCING PHOSPHORUS PENTAFLUORIDE

(71) Applicant: Kanto Denka Kogyo co., Ltd., Tokyo (JP)

(72) Inventors: Go Takikawa, Okayama (JP); Shinsuke Katayama, Okayama (JP); Osamu Omae, Okayama (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 801 days.

(21) Appl. No.: 16/469,987

(22) PCT Filed: Mar. 12, 2018

(86) PCT No.: PCT/JP2018/009462
§ 371 (c)(1),
(2) Date: Jun. 14, 2019

(87) PCT Pub. No.: WO2018/168752
PCT Pub. Date: Sep. 20, 2018

(65) Prior Publication Data

US 2020/0087146 A1 Mar. 19, 2020

(30) Foreign Application Priority Data

Mar. 13, 2017 (JP) ............................ JP2017-047045

(51) Int. Cl.
*C01B 25/10* (2006.01)

(52) U.S. Cl.
CPC .................................. *C01B 25/10* (2013.01)

(58) Field of Classification Search
CPC .................................................... C01B 25/10
See application file for complete search history.

(56) References Cited

U.S. PATENT DOCUMENTS

| | | | |
|---|---|---|---|
| 9,034,290 | B2 | 5/2015 | Waki et al. |
| 2011/0286905 | A1 | 11/2011 | Waki et al. |

FOREIGN PATENT DOCUMENTS

| | | | |
|---|---|---|---|
| CN | 1188072 | A | 7/1998 |
| CN | 101844754 | A | 9/2010 |
| CN | 102757027 | A | 10/2012 |

(Continued)

OTHER PUBLICATIONS

Extended European Search Report issued in European Patent Application No. 18768502.9 dated Oct. 30, 2020.

(Continued)

*Primary Examiner* — James A Fiorito
(74) *Attorney, Agent, or Firm* — Nixon & Vanderhye

(57) ABSTRACT

Disclosed is a method for producing phosphorus pentafluoride, including mixing and reacting phosphorus trichloride and chlorine with a large excess of anhydrous hydrogen fluoride liquid, thereby producing phosphorus pentafluoride, wherein heat of reaction generated through the production of phosphorus pentafluoride is removed with latent heat of evaporation of hydrogen fluoride. It is preferable that the anhydrous hydrogen fluoride liquid is circulated, and, in this state, phosphorus trichloride and chlorine are mixed with the anhydrous hydrogen fluoride liquid. Furthermore, it is also preferable that the anhydrous hydrogen fluoride liquid is circulated along a circulation path, or that the anhydrous hydrogen fluoride liquid is circulated through stirring in a reaction vessel.

20 Claims, 1 Drawing Sheet

(56) References Cited

FOREIGN PATENT DOCUMENTS

| | | | |
|---|---|---|---|
| CN | 102976298 | A | 3/2013 |
| CN | 103153847 | A | 6/2013 |
| GN | 102757027 | | 10/2012 |
| JP | 04-175216 | | 6/1992 |
| JP | 05-279003 | | 10/1993 |
| JP | 10-245211 | | 9/1998 |
| JP | 11-171517 | | 6/1999 |
| JP | 2002-519294 | | 7/2002 |
| JP | 2009-062259 | | 3/2009 |
| JP | 2012-126621 | A | 7/2012 |

OTHER PUBLICATIONS

International Search Report, PCT/JP2018/009462, dated May 29, 2018.

METHOD FOR PRODUCING PHOSPHORUS PENTAFLUORIDE

TECHNICAL FIELD

The present invention relates to a method for producing phosphorus pentafluoride.

BACKGROUND ART

Phosphorus pentafluoride ($PF_5$) is a useful substance as a raw material of various types of hexafluorophosphates, in particular, lithium hexafluorophosphate that can be used as an electrolyte for lithium batteries, lithium ion secondary batteries, and the like. Furthermore, phosphorus pentafluoride is also used as a catalyst for organic synthesis reactions or a doping agent for semiconductor materials.

As a method for producing phosphorus pentafluoride, Patent Literature 1 describes a method for synthesizing $PF_5$ by adding phosphorus pentachloride ($PCl_5$) to an HF solution. According to this method, $PCl_5$, which is difficult to handle because it is a highly hygroscopic solid, has to be added continuously and quantitatively to an HF solution, and thus it is difficult to control the reaction.

Furthermore, Patent Literature 2 proposes a method including generating $PF_3$ gas through a reaction of phosphorus trichloride ($PCl_3$) and HF (a first fluorinating step), generating gaseous $PF_3Cl_2$ through a reaction of the generated $PF_3$ gas and $Cl_2$ gas (a chlorinating step), and generating $PF_5$ through a reaction of $PF_3Cl_2$ and HF (a second fluorinating step).

CITATION LIST

Patent Literature

Patent Literature 1: JP H4-175216A
Patent Literature 2: JP HU-171517A

SUMMARY OF INVENTION

However, the method of Patent Literature 2 requires multiple steps, equipment necessary for the reaction is large in scale, and the production steps are complex, and thus the production cost is high.

Accordingly, it is an object of the present invention to provide a method for producing phosphorus pentafluoride, the method being capable of solving the disadvantages of the above-described conventional techniques.

The present inventors conducted an in-depth study, and found that, it is possible to safely and stably produce phosphorus pentafluoride, by mixing a large excess of anhydrous hydrogen fluoride liquid with phosphorus trichloride and chlorine, and evaporating hydrogen fluoride using heat of reaction of a reaction caused by the mixing.

The present invention is based on this finding, and provides a method for producing phosphorus pentafluoride, including mixing and reacting phosphorus trichloride and chlorine with a large excess of anhydrous hydrogen fluoride liquid, thereby producing phosphorus pentafluoride, wherein heat of reaction generated through the production of phosphorus pentafluoride is removed with latent heat of evaporation of hydrogen fluoride.

DESCRIPTION OF EMBODIMENTS

Figure 1:
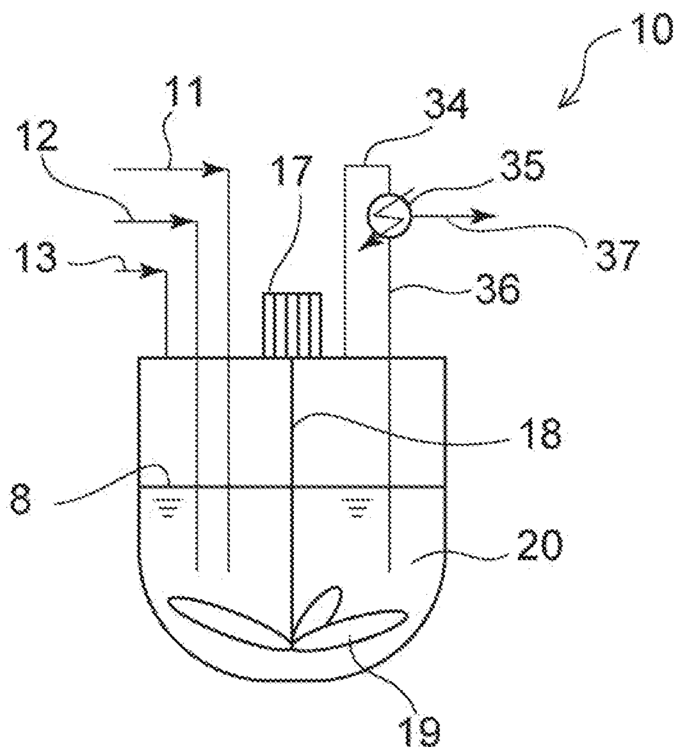
FIG. 1 shows an example of an apparatus that is used in a production method of the present invention.

Hereinafter, a method of the present invention for producing phosphorus pentafluoride (hereinafter, also referred to simply as "this production method") will be described by way of preferred embodiments.

In this production method, phosphorus trichloride ($PCl_3$) is used as a phosphorus source. Phosphorus trichloride is a liquid at room temperature. Thus, phosphorus trichloride is easy to handle compared with phosphorus pentachloride ($PCl_5$), which is a solid, and is also easy to handle in a water prohibitive state, that is, hydrolysis can be easily suppressed, and the purity of the final product can be stabilized. Furthermore, phosphorus trichloride is inexpensive, and highly pure products thereof are easily available.

In this production method, chlorine is used as an oxidant. Chlorine is inexpensive and easily available. When introduced into a reactor, chlorine may be either a gas or a liquid. In this production method, when introduced into a reactor as a gas, typically, chlorine in a gaseous state is mixed with anhydrous hydrogen fluoride, and is reacted with phosphorus trichloride. Alternatively; when introduced into a reactor as a liquid, chlorine can be reacted with phosphorus trichloride as in the case where chlorine is introduced into a reactor as a gas.

The hydrogen fluoride that is used in this production method is anhydrous hydrogen fluoride. Anhydrous hydrogen fluoride contains moisture in an amount in a mass basis of typically 1000 ppm or less, and preferably 600 ppm or less.

In this production method, a large excess of anhydrous hydrogen fluoride relative to the phosphorus trichloride and chlorine is used. The reaction formula of the reaction in which phosphorus trichloride, chlorine, and hydrogen fluoride are reacted with each other to produce phosphorus pentafluoride is as below, but this reaction generates a large amount of heat of reaction. In this production method, a large excess of anhydrous hydrogen fluoride acts as a liquid medium, and, even if heat of reaction is generated, the anhydrous hydrogen fluoride evaporates and the amount of heat of reaction is eliminated by the amount of latent heat of evaporation from the anhydrous hydrogen fluoride and thus the heat of reaction of the anhydrous hydrogen fluoride liquid is removed. Accordingly, the temperature of the reaction liquid during the reaction is stable, and it is possible to safely produce phosphorus pentafluoride through a simple reaction.

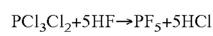

$$PCl_3Cl_2+5HF \rightarrow PF_5+5HCl$$

"Large excess" in this specification preferably refers to a state in which the amount of anhydrous hydrogen fluoride is 20 moles or more with respect to 1 mole of phosphorus trichloride that is mixed with the hydrogen fluoride. Furthermore, the amount of anhydrous hydrogen fluoride is preferably 20 moles or more also with respect to 1 mole of chlorine that is mixed with the hydrogen fluoride. In view of operation stability, the amount of anhydrous hydrogen fluoride is more preferably 80 moles or more, particularly preferably 200 moles or more, and even more preferably 400 moles or more, with respect to 1 mole of phosphorus trichloride that is mixed with the hydrogen fluoride. Furthermore, the amount of anhydrous hydrogen fluoride is preferably 20 moles or more, more preferably 80 moles or more, particularly preferably 200 moles or more, and even more preferably 400 moles or more, with respect to 1 mole of chlorine that is mixed with the hydrogen fluoride.

"Amounts of phosphorus trichloride and chlorine that are mixed with the hydrogen fluoride" as described herein refers to, in the case of adding phosphorus trichloride and chlorine to anhydrous hydrogen fluoride that has been introduced into a reactor as described later, the amounts of phosphorus trichloride and chlorine that are added.

In the case of mixing a large excess of anhydrous hydrogen fluoride with phosphorus trichloride and chlorine, anhydrous hydrogen fluoride may be added to phosphorus trichloride and chlorine, or phosphorus trichloride and chlorine may be added to anhydrous hydrogen fluoride, but, in view of safety, temperature stability, and the like, phosphorus trichloride and chlorine are preferably added to anhydrous hydrogen fluoride. In the case of adding phosphorus trichloride and chlorine to anhydrous hydrogen fluoride, phosphorus trichloride and chlorine may be simultaneously added to a large excess of anhydrous hydrogen fluoride liquid, or one of phosphorus trichloride and chlorine may be added first to a large excess of anhydrous hydrogen fluoride liquid. In order to improve reaction efficiency and prevent the generation of by-products, the amount of chlorine that is used in this production method is preferably from 0.18 to 1.20 moles, more preferably from 0.50 to 1.10 moles, and even more preferably from 0.80 to 1.05 moles, in terms of chlorine equivalent, with respect to 1 mole of phosphorus trichloride.

Phosphorus trichloride and chlorine may be continuously introduced, intermittently introduced, or collectively introduced at one time to a large excess of anhydrous hydrogen fluoride liquid. Phosphorus trichloride and chlorine are preferably continuously introduced, in order to improve reaction efficiency because continuous introduction allows them to be easily mixed with hydrogen fluoride. "Continuously" as described herein refers to a state in which adding at 0.1 g/sec or more is continued preferably, for example, for 10 seconds or more, and preferably for 1 minute or more.

The reaction temperature when mixing hydrogen fluoride with phosphorus trichloride and chlorine to produce phosphorus pentafluoride is preferably −10° C. or more, in order to improve the reaction efficiency of hydrogen fluoride with phosphorus trichloride and chlorine. Meanwhile, the reaction temperature is preferably 19° C. or less, in order to keep hydrogen fluoride in a liquid state and to easily realize temperature stability during the reaction. From these points of view, the reaction temperature in the production reaction of phosphorus pentafluoride is preferably from −10 to 19° C., and more preferably from −5 to 15° C. "Reaction temperature" as described herein refers to the temperature of anhydrous hydrogen fluoride liquid, in the case of adding phosphorus trichloride and chlorine to a large excess of anhydrous hydrogen fluoride and mixing them.

The production reaction of phosphorus pentafluoride is caused to occur preferably under −10 to 50 kPaG of pressure, in order to improve reaction efficiency and to control the amount of hydrogen fluoride that is evaporated. From this point of view, the production reaction of phosphorus pentafluoride is caused to occur more preferably under −5 to 30 kPaG of pressure, and even more preferably under 0 to 20 kPaG of pressure.

This reaction may be caused to occur either in a batch-type reactor or in a continuous reactor. Typically, the reactor is made of a corrosion-resistant material.

Phosphorus trichloride and chlorine are preferably mixed with a large excess of anhydrous hydrogen fluoride liquid that is being circulated, in order to obtain temperature stability and to make the reaction uniform.

The state of being circulated refers to a state where a material repeatedly completes a course and returns to the original position.

Examples of the method for circulating anhydrous hydrogen fluoride liquid include a method for circulating anhydrous hydrogen fluoride liquid through stirring inside a reaction vessel, and a method for circulating anhydrous hydrogen fluoride liquid along a circulation path. "Circulation path" as described herein refers to a path starting from a certain position and returning to that position, and is formed by, for example, providing a tube in the shape of a ring, a U, or a C, A U-shaped or C-shaped tube can form a circulation path if both ends thereof are connected to the same storage vessel or respectively connected to two or more different storage vessels that are connected to each other. A storage vessel constituting a circulation path may be referred to as a circulation storage vessel.

In this production method, evaporated anhydrous hydrogen fluoride is preferably collected and cooled down and liquefied, and then the liquefied matter is caused to merge with anhydrous hydrogen fluoride liquid in a reactor. With this processing, it is possible to suppress a significant change in the amount of anhydrous hydrogen fluoride liquid inside the reactor. Furthermore, since hydrogen fluoride that has been cooled is returned to a large excess of anhydrous hydrogen fluoride liquid, it is possible to more easily reduce the temperature of the hydrogen fluoride liquid and control the reaction temperature. Furthermore, the gaseous phase that is generated in accordance with the production reaction of phosphorus pentafluoride include, in addition to hydrogen fluoride, phosphorus pentafluoride and hydrogen chloride that are reaction products, but the boiling points of phosphorus pentafluoride and hydrogen chloride are significantly lower than that of hydrogen fluoride. Accordingly, only hydrogen fluoride is likely to liquefy in the gaseous phase, and, through the liquefaction, hydrogen fluoride can be easily separated from phosphorus pentafluoride that is the target material.

Hereinafter, this production method will be described in more detail with reference to the drawings related to an apparatus for producing phosphorus pentafluoride.

A reactor 10 shown in FIG. 1 circulates anhydrous hydrogen fluoride by stirring anhydrous hydrogen fluoride liquid inside a reaction vessel 20.

In the reactor 10 in FIG. 1, anhydrous hydrogen fluoride has been introduced into the reaction vessel 20. The reaction vessel 20 includes a rotational shaft 18 that is connected to a rotary motor 17, and an impeller 19 that is fixed to the rotational shaft 18. The impeller 19 is fixed to a position at a height corresponding to a predetermined amount of anhydrous hydrogen fluoride. The reactor 10 is such that, when the impeller 19 rotates about the rotational shaft 18 in accordance with the rotation of the rotary motor 17, anhydrous hydrogen fluoride liquid inside the reaction vessel 20 flows about the rotational shaft 18 in accordance with the rotation. The flowing about the rotational shaft 18 corresponds to circulation of anhydrous hydrogen fluoride. There is no particular limitation on the type of impeller 19, and examples thereof include various impellers such as a commonly used paddle impeller, turbine blade, and anchor blade. The rotational speed of the rotational shaft 18 may be, for example, from 10 to 3000 rpm.

In FIG. 1, an inlet path 11 through which phosphorus trichloride flows into the reaction vessel 20 and an inlet path 12 through which chlorine flows into the reaction vessel 20 are provided. Paths 11, 12, 13, 34, 36, and 37 in FIG. 1 are constituted by tubular members. In the example shown in FIG. 1, two inlet paths 11 and 12 extend to points below a liquid surface 8 of anhydrous hydrogen fluoride liquid.

The reactor 10 shown in FIG. 1 includes a gas outlet path 34 through Which gas generated from anhydrous hydrogen fluoride liquid stored in the reaction vessel 20 flows out from the anhydrous hydrogen fluoride liquid. A heat exchanger 35 that can cool down gas in the gas outlet path 34 is arranged at a point on the path 34. The heat exchanger 35 exchanges heat between an appropriate refrigerant and gas in the path 34, and can cool down the gas in the path 34 to a temperature that is equal to or greater than the boiling point (−84.8° C.) of phosphorus pentafluoride and less than the boiling point (19.5° C.) of hydrogen fluoride. Since the boiling point of hydrogen chloride that is a by-product in this production method is −85.1° C., hydrogen chloride is usually not liquefied at a temperature within this range. The cooling temperature is preferably from −80 to −10° C. The gas outlet path 34 is divided into a liquid returning path 36 and a gas discharge path 37 at a point downstream of the heat exchanger 35. A liquid generated through cooling by the heat exchanger 35 returns to the reaction vessel 20 through the liquid returning path 36, and a gas after cooling is discharged out of the reaction system through the gas discharge path 37.

The reactor 10 further includes an inlet path 13 through which anhydrous hydrogen fluoride flows into the reaction vessel 20. The reactor 10 includes a sensor (not shown) for measuring the height of the liquid surface 8 of the anhydrous hydrogen fluoride in the reaction vessel 20, and the sensor is connected to an unshown control function. When the sensor detects that the height of the liquid surface 8 of the anhydrous hydrogen fluoride has decreased, the control function can calculate the amount of hydrogen fluoride corresponding to the decrease in the height, and control a valve (not shown) for opening and closing the inlet path 13 so as to supply anhydrous hydrogen fluoride in an amount corresponding to the decrease in the height of the liquid surface 8. It is preferable to perform control such that the liquid amount of anhydrous hydrogen fluoride in the reaction vessel 20 is kept constant in this manner.

When producing phosphorus pentafluoride using the reactor 10 with the above-described configuration, first, the rotational shaft 18 and the impeller 19 are rotated by rotating the rotary motor 17, and thus anhydrous hydrogen fluoride liquid is caused to flow about the rotational shaft 18 in the reaction vessel 20, and the anhydrous hydrogen fluoride is circulated in the reaction vessel 20. In this state, phosphorus trichloride and chlorine are caused to flow through the phosphorus trichloride inlet path 11 and the chlorine inlet path 12 into a large excess of anhydrous hydrogen fluoride, and are mixed with the anhydrous hydrogen fluoride. Accordingly, gaseous phosphorus pentafluoride and gaseous hydrogen chloride are generated, and hydrogen fluoride is evaporated by the heat of reaction of the production reaction of phosphorus pentafluoride. The heat of reaction is removed with latent heat of the evaporation, and thus the temperature of the anhydrous hydrogen fluoride liquid is kept constant. The evaporated hydrogen fluoride that has been mixed with phosphorus pentafluoride and chlorine is guided along the gas outlet path 34 and reaches the heat exchanger 35. The hydrogen fluoride that has reached the heat exchanger 35 is cooled, is returned through the liquid returning path 36 to the reaction vessel 20, and is caused to merge with a large excess of anhydrous hydrogen fluoride liquid. Meanwhile, the mixture gas of phosphorus pentafluoride and hydrogen chloride is discharged through the gas discharge path 37 and out of the system. Phosphorus pentafluoride can be isolated from the mixture gas of phosphorus pentafluoride and hydrogen chloride using a known separation method such as distillation.

As described above, according to this production method, it is possible to produce phosphorus pentafluoride with a very simple method while ensuring temperature stability and safety, by using a large excess of anhydrous hydrogen fluoride liquid.

Figure 2:
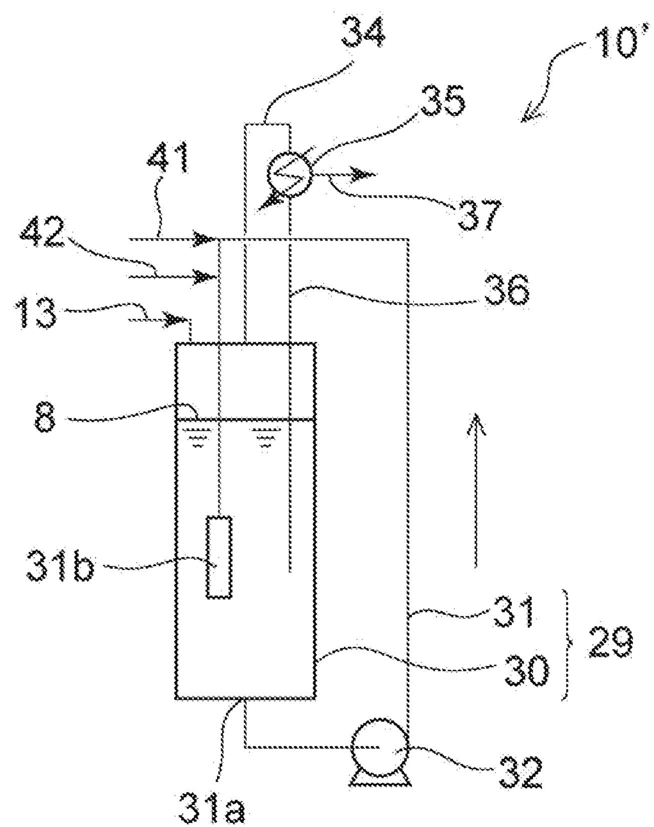
FIG. 2 shows another example of an apparatus that is used in the production method of the present invention.

Next, an example of this production method in the case of producing phosphorus pentafluoride using a circulation path instead of a stirring member will be described with reference to FIG. 2. Paths 13, 31, 41, 42, 34, 36, and 37 in FIG. 2 are constituted by tubular members. In FIG. 2, those having the same configuration as in FIG. 1 are denoted by the same reference numerals as in FIG. 1, and a description there of has been omitted.

A reactor 10' shown in FIG. 2 does not include an impeller or the like, but includes a path 31 for circulation for circulating anhydrous hydrogen fluoride. The path 31 for circulation is a tubular member in the shape of a ring with a part missing. The shape of a ring with a part missing is also referred to as the shape of a C. Both ends of the path 31 for circulation, specifically, both of an end portion 31*a* on the suction side and an end portion 31*b* on the ejection side are connected to a circulation storage vessel 30 in which anhydrous hydrogen fluoride is stored and circulated. "Anhydrous hydrogen fluoride is circulated in the circulation storage vessel 30" as described herein does not refer to a state in which anhydrous hydrogen fluoride is stirred inside the circulation storage vessel 30, but refers to a state in which anhydrous hydrogen fluoride in the circulation storage vessel 30 is circulated through the path 31 for circulation. However, anhydrous hydrogen fluoride may also be stirred inside the circulation storage vessel 30. With this configuration, the circulation storage vessel 30 and the path 31 for circulation constitute a circulation path 29 as shown in FIG. 2. While anhydrous hydrogen fluoride liquid is being circulated, 80 vol % or more of the total amount of anhydrous hydrogen fluoride liquid in the reactor 10' is preferably present in the circulation storage vessel 30, in view of reaction temperature stability and the like.

In the reactor 10', a circulation pump 32 for providing circulation power is arranged at a point on the path 31 for circulation. Accordingly, the reactor 10' is such that anhydrous hydrogen fluoride liquid is sucked from the circulation storage vessel 30 into the end portion 31*a* on the suction side of the path 31 for circulation, and the anhydrous hydrogen fluoride liquid is ejected from the end portion 31*b* on the ejection side into the circulation storage vessel 30. Furthermore, a phosphorus trichloride inlet path 41 and a chlorine inlet path 42 are connected to the path 31 for circulation downstream of the circulation pump 32, and thus phosphorus trichloride and chlorine can be caused to flow into the path 31 for circulation of anhydrous hydrogen fluoride. In FIG. 2, the phosphorus trichloride inlet path 41 is connected upstream of the chlorine inlet path 42, along the path 31 for circulation of anhydrous hydrogen fluoride, but the connection method is not limited thereto.

In the reactor 10' in FIG. 2, the gas outlet path 34 is provided such that gas can flow out from the anhydrous hydrogen fluoride liquid in the circulation storage vessel 30. Furthermore, in the reactor 10' in FIG. 2, the inlet path 13 through which anhydrous hydrogen fluoride flows into the circulation storage vessel 30 is provided separately from the path 31 for circulation. It is possible to perform control as in the control based on the height of the liquid surface 8 in FIG. 1, also by using the inlet path 13.

When producing phosphorus pentafluoride using the reactor 10' in FIG. 2 with the above-described configuration, anhydrous hydrogen fluoride liquid is circulated in the circulation storage vessel 30 and the path 31 for circulation by operating the circulation pump 32, and, in this state, phosphorus trichloride and chlorine are caused to flow into anhydrous hydrogen fluoride, and are mixed with the anhydrous hydrogen fluoride. Also in the case of the production method using the reactor 10' shown in FIG. 2, it is possible to safely and efficiently produce phosphorus pentafluoride with a simple apparatus, and to perform mass production with a smaller apparatus, as in the method using the apparatus shown in FIG. 1.

Furthermore, according to the method shown in FIG. 2, it is possible to adjust the amount of anhydrous hydrogen fluoride that is circulated, separately from the amount of anhydrous hydrogen fluoride present in the circulation storage vessel 30 located downstream of points from which phosphorus trichloride and chlorine flow in (the inlet paths 41 and 42), and thus it is possible to more easily control the reaction speed, that is, it is possible to more safely allow the reaction to progress.

In the reactor 10' in FIG. 2, the circulation amount per minute along the path 31 for circulation is preferably from 5 to 70 vol % of the amount of anhydrous hydrogen fluoride liquid initially introduced into the reactor 10', in order to easily improve reaction efficiency through circulation of a large excess of anhydrous hydrogen fluoride along the path 31 for circulation, and to easily control a reaction. Furthermore, in order to improve reaction efficiency and to easily control a reaction, the amount of phosphorus trichloride that flows into the circulation path 29 (the path 31 for circulation or the circulation storage vessel 30) per minute is preferably from 0.001 to 1.0 mol % of the amount of anhydrous hydrogen fluoride that is circulated per minute. From the same points of view, the amount of chlorine that flows into the circulation path 29 (the path 31 for circulation or the circulation storage vessel 30) per minute is preferably from 0.001 to 1.0 mol % of the amount of anhydrous hydrogen fluoride that is circulated per minute.

Examples of the materials for forming the reactors 10 and 10', in particular, for forming the above-described paths, reaction vessels, and circulation storage vessels include materials that are resistant to corrosion by hydrogen fluoride, and particularly preferably metals that are resistant to corrosion by hydrogen fluoride. Examples of the metals include Hastelloy, Inconel, Monel, stainless steel, and iron and steel.

Above, this production method was described by way of preferred embodiments, but the production method is not limited thereto. For example, hydrogen fluoride evaporated heat of reaction may be discharged out of the system as is, without being liquefied.

EXAMPLES

Hereinafter, the present invention will be described in more detail by way of examples. However, the scope of the present invention is not limited to the examples.

Example 1

The reactor 10 shown in FIG. 1 was used. The reactor 10 is made of a metal that is resistant to corrosion by hydrogen fluoride.

First, 30 kg of anhydrous hydrogen fluoride liquid was introduced into the reaction vessel 20 of the reactor 10. The rotational shaft 18 connected to the rotary motor 17 and the impeller 19 fixed to the rotational shaft 18 were used. The rotational shall 18 and the impeller 19 were rotated at 100 rpm so that anhydrous hydrogen fluoride liquid inside the reaction vessel 20 was circulated. Then, 1860 g of phosphorus trichloride liquid and 1020 g of chlorine gas were continuously introduced into the reaction vessel 20 at constant speeds each for 60 minutes, and were reacted with anhydrous hydrogen fluoride under 0.5 kPaG of pressure. With heat of the reaction, part of the hydrogen fluoride (HF) evaporated, was caused to flow together with phosphorus pentafluoride ($PF_5$) that is a product and hydrogen chloride (HCl) that is a by-product through the gas outlet path 34 into the heat exchanger 35, and was cooled down to −30° C. by the heat exchanger 35. Accordingly, the evaporated hydrogen fluoride (HF) was cooled down and liquefied, and the liquefied matter was returned to the reaction vessel 20, and was caused to merge with anhydrous hydrogen fluoride liquid in the reaction vessel 20. Meanwhile, the phosphorus pentafluoride ($PF_5$) and the hydrogen chloride (HCl) were collected as a gaseous phase. The yield of phosphorus pentafluoride ($PF_5$) with respect to the amount of phosphorus trichloride introduced was 97 mol %, While the reactor 10 was running, the amount of hydrogen fluoride (HF) that flowed thereinto was controlled such that the height of the liquid surface 8 was kept constant, and the temperature of anhydrous hydrogen fluoride liquid in the reaction vessel 20 was kept constant at around 6° C.

Example 2

The reactor 10' shown in FIG. 2 was used. The reactor 10' is made of a metal that is resistant to corrosion by hydrogen fluoride.

First, 940 kg of anhydrous hydrogen fluoride liquid was introduced into the circulation storage vessel 30 of the reactor 10'. The pump 32 was operated so that anhydrous hydrogen fluoride liquid was circulated along the path 31 for circulation. Furthermore, the amount of anhydrous hydrogen fluoride liquid circulated per minute was set to 50 vol % of the amount of anhydrous hydrogen fluoride liquid initially introduced into the reactor 10'. While the anhydrous hydrogen fluoride liquid was being circulated, 80 vol % or more of the total amount of anhydrous hydrogen fluoride liquid in the reactor 10' was present in the circulation storage vessel 30. Then, 6440 g of phosphorus trichloride liquid and 3210 g of chlorine gas were continuously introduced into the circulation storage vessel 30 at constant speeds each for 100 minutes, and were reacted with anhydrous hydrogen fluoride under 3 kPaG of pressure. With heat of the reaction, part of the hydrogen fluoride (HF) evaporated, was caused to flow together with phosphorus pentafluoride ($PF_5$) that is a product and hydrogen chloride (HCl) that is a by-product through the gas outlet path 34 into the heat exchanger 35, and was cooled down to −30° C. by the heat exchanger 35. Accordingly, the evaporated hydrogen fluoride (HF) was cooled down and liquefied, and was returned to the circulation storage vessel 30. Meanwhile, the phosphorus pentafluoride ($PF_5$) and the hydrogen chloride (HCl) were collected as a gaseous phase. The yield of phosphorus pentafluoride ($PF_5$) with respect to the amount of phosphorus trichloride introduced was 96 mol %. While the reactor 10' was running, the amount of hydrogen fluoride (HF) that flowed thereinto was controlled such that the height of the liquid surface 8 was kept constant, and the temperature of anhydrous hydrogen fluoride liquid in the circulation storage vessel 30 was kept constant at around 10° C.

As described above, it is seen that, according to the production method of the present invention, it is possible to safely and stably produce phosphorus pentafluoride with a simple apparatus. Thus, according to the production method of the present invention, it is possible to perform mass production of phosphorus pentafluoride with a smaller apparatus.

INDUSTRIAL APPLICABILITY

According to the method of the present invention for producing phosphorus pentafluoride, it is possible to safely and easily perform mass production of phosphorus pentafluoride with a simple reactor using inexpensive and easily available raw materials.

The invention claimed is:

1. A method for producing phosphorus pentafluoride, comprising mixing and reacting phosphorus trichloride and chlorine with a large excess of anhydrous hydrogen fluoride liquid, thereby producing phosphorus pentafluoride, wherein a reaction temperature when mixing hydrogen fluoride with phosphorus trichloride and chlorine, thereby producing phosphorus pentafluoride, is −10 to 19° C., an amount of anhydrous hydrogen fluoride is 80 moles or more, per 1 mole of phosphorus trichloride that is mixed with the hydrogen fluoride, and hydrogen fluoride in an amount corresponding to a decrease in a height of a liquid surface of the anhydrous hydrogen fluoride is supplied while heat of reaction generated through the production of phosphorus pentafluoride is removed with latent heat of evaporation of hydrogen fluoride.

2. The method for producing phosphorus pentafluoride according to claim 1, wherein the anhydrous hydrogen fluoride liquid is circulated, and, in this state, phosphorus trichloride and chlorine are mixed with the anhydrous hydrogen fluoride liquid.

3. The method for producing phosphorus pentafluoride according to claim 2, wherein the anhydrous hydrogen fluoride liquid is circulated along a circulation path.

4. The method for producing phosphorus pentafluoride according to claim 2, wherein the anhydrous hydrogen fluoride liquid is circulated through stirring in a reaction vessel.

5. The method for producing phosphorus pentafluoride according to claim 1, wherein the evaporated hydrogen fluoride is cooled down and liquefied, and the liquefied matter is caused to merge with the anhydrous hydrogen fluoride liquid.

6. The method for producing phosphorus pentafluoride according to claim 1, wherein a production reaction of phosphorus pentafluoride is performed under conditions of −10 to 50 kPaG.

7. The method for producing phosphorus pentafluoride according to claim 1, wherein the amount of chlorine that is used is from 0.18 to 1.20 equivalents in terms of chlorine equivalent with respect to the amount of phosphorus trichloride.

8. The method for producing phosphorus pentafluoride according to claim 1, wherein phosphorus trichloride and chlorine are continuously introduced to the anhydrous hydrogen fluoride liquid.

9. The method for producing phosphorus pentafluoride according to claim 2, wherein the evaporated hydrogen fluoride is cooled down and liquefied, and the liquefied matter is caused to merge with the anhydrous hydrogen fluoride liquid.

10. The method for producing phosphorus pentafluoride according to claim 3, wherein the evaporated hydrogen fluoride is cooled down and liquefied, and the liquefied matter is caused to merge with the anhydrous hydrogen fluoride liquid.

11. The method for producing phosphorus pentafluoride according to claim 4, wherein the evaporated hydrogen fluoride is cooled down and liquefied, and the liquefied matter is caused to merge with the anhydrous hydrogen fluoride liquid.

12. The method for producing phosphorus pentafluoride according to claim 2, wherein a production reaction of phosphorus pentafluoride is performed under conditions of −10 to 50 kPaG.

13. The method for producing phosphorus pentafluoride according to claim 3, wherein a production reaction of phosphorus pentafluoride is performed under conditions of −10 to 50 kPaG.

14. The method for producing phosphorus pentafluoride according to claim 4, wherein a production reaction of phosphorus pentafluoride is performed under conditions of −10 to 50 kPaG.

15. The method for producing phosphorus pentafluoride according to claim 13, wherein a production reaction of phosphorus pentafluoride is performed under conditions of −10 to 50 kPaG.

16. The method for producing phosphorus pentafluoride according to claim 2, wherein the amount of chlorine that is used is from 0.18 to 1.20 equivalents in terms of chlorine equivalent with respect to the amount of phosphorus trichloride.

17. The method for producing phosphorus pentafluoride according to claim 3, wherein the amount of chlorine that is used is from 0.18 to 1.20 equivalents in terms of chlorine equivalent with respect to the amount of phosphorus trichloride.

18. The method for producing phosphorus pentafluoride according to claim 4, wherein the amount of chlorine that is used is from 0.18 to 1.20 equivalents in terms of chlorine equivalent with respect to the amount of phosphorus trichloride.

19. The method for producing phosphorus pentafluoride according to claim 5, wherein the amount of chlorine that is used is from 0.18 to 1.20 equivalents in terms of chlorine equivalent with respect to the amount of phosphorus trichloride.

20. The method for producing phosphorus pentafluoride according to claim 6, wherein the amount of chlorine that is used is from 0.18 to 1.20 equivalents in terms of chlorine equivalent with respect to the amount of phosphorus trichloride.

* * * * *